United States Patent
Yang et al.

(10) Patent No.: US 11,321,197 B2
(45) Date of Patent: May 3, 2022

(54) FILE SERVICE AUTO-REMEDIATION IN STORAGE SYSTEMS

(71) Applicant: VMware, Inc., Palo Alto, CA (US)

(72) Inventors: Yang Yang, Shanghai (CN); Ye Zhang, Shanghai (CN); Xiang Yu, Shanghai (CN); Wenguang Wang, Santa Clara, CA (US); Richard P. Spillane, Mountain View, CA (US); Sriram Patil, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 88 days.

(21) Appl. No.: 16/859,944

(22) Filed: Apr. 27, 2020

(65) Prior Publication Data

US 2021/0334178 A1    Oct. 28, 2021

(51) Int. Cl.
| | |
|---|---|
| *G06F 11/00* | (2006.01) |
| *G06F 11/20* | (2006.01) |
| *G06F 11/30* | (2006.01) |
| *G06F 11/34* | (2006.01) |
| *G06F 16/17* | (2019.01) |
| *G06F 9/455* | (2018.01) |

(52) U.S. Cl.
CPC ...... *G06F 11/2023* (2013.01); *G06F 9/45558* (2013.01); *G06F 11/3006* (2013.01); *G06F 11/3034* (2013.01); *G06F 11/3495* (2013.01); *G06F 16/1734* (2019.01); *G06F 2201/80* (2013.01)

(58) Field of Classification Search
CPC ............ G06F 11/2023; G06F 11/3006; G06F 11/3034; G06F 11/3495; G06F 16/1734; G06F 9/45558; G06F 2201/80
See application file for complete search history.

(56) References Cited

U.S. PATENT DOCUMENTS

| | | | |
|---|---|---|---|
| 7,734,947 B1 * | 6/2010 | Frangioso | G06F 11/1482 714/4.1 |
| 10,275,326 B1 * | 4/2019 | Stickle | G06F 11/0751 |
| 2012/0297236 A1 * | 11/2012 | Ziskind | G06F 11/1484 714/3 |
| 2014/0297597 A1 * | 10/2014 | Matsubara | G06F 11/1438 707/681 |
| 2015/0074060 A1 * | 3/2015 | Varadharajan | G06F 16/188 707/649 |
| 2015/0154085 A1 * | 6/2015 | Iwasaki | G06F 11/27 707/678 |

(Continued)

*Primary Examiner* — Jonathan D Gibson
(74) *Attorney, Agent, or Firm* — Loza & Loza, LLP

(57) ABSTRACT

System and method for automatic remediation for a distributed file system uses a file system (FS) remediation module running in a cluster management server and FS remediation agents running in a cluster of host computers. The FS remediation module monitors the cluster of host computers for related events. When a first file system service (FSS)-impacting event is detected, a cluster-level remediation action is executed at the cluster management server by the FS remediation module in response to the detected first FSS-impacting event. When a second FSS-impacting event is detected, a host-level remediation action is executed at one or more of the host computers in the cluster by the FS remediation agents in response to the detected second FSS-impacting event.

18 Claims, 6 Drawing Sheets

(56) References Cited

U.S. PATENT DOCUMENTS

| | | | | |
|---|---|---|---|---|
| 2015/0355982 A1* | 12/2015 | Ganesan | ............. | G06F 9/45558 |
| | | | | 714/4.11 |
| 2015/0378853 A1* | 12/2015 | Sevigny | .............. | G06F 11/1484 |
| | | | | 714/4.11 |
| 2016/0283335 A1* | 9/2016 | Yao | ........................ | G06F 11/203 |
| 2019/0324873 A1* | 10/2019 | Patel | ................... | G06F 11/3055 |
| 2020/0250042 A1* | 8/2020 | Sharma | ................. | G06F 9/5072 |

* cited by examiner

FILE SERVICE AUTO-REMEDIATION IN STORAGE SYSTEMS

BACKGROUND

Hyperconverged infrastructure (HCI) combines storage, compute and networking into a single system. This simplified solution uses software and x86 servers to replace expensive, purpose-built hardware. With HCI, data center complexity is decreased, while increasing scalability.

In an HCI, software-defined storage is typically used to provide the underlying storage for the computing resource, as well as the storage for applications running in the HCI. Various standard storage services are needed to support software-defined storage in an HCI, including network file services that provide file system protocol, such as Network File System (NFS) and Server Message Block (SMB), to software entities, e.g., applications, virtual machines (VMs) and containers, running on the HCI.

In order to ensure that software-defined storage in an HCI operates properly, hardware and software issues that can affect the file services should be resolved. However, current solutions to remediate file service issues may involve multiple administrators with different expertise to manually perform various remediation tasks, such as manually restarting a certain process after a liveness check on certain software components.

BRIEF DESCRIPTION OF THE DRAWINGS

Throughout the description, similar reference numbers may be used to identify similar elements.

DETAILED DESCRIPTION

Figure 1:
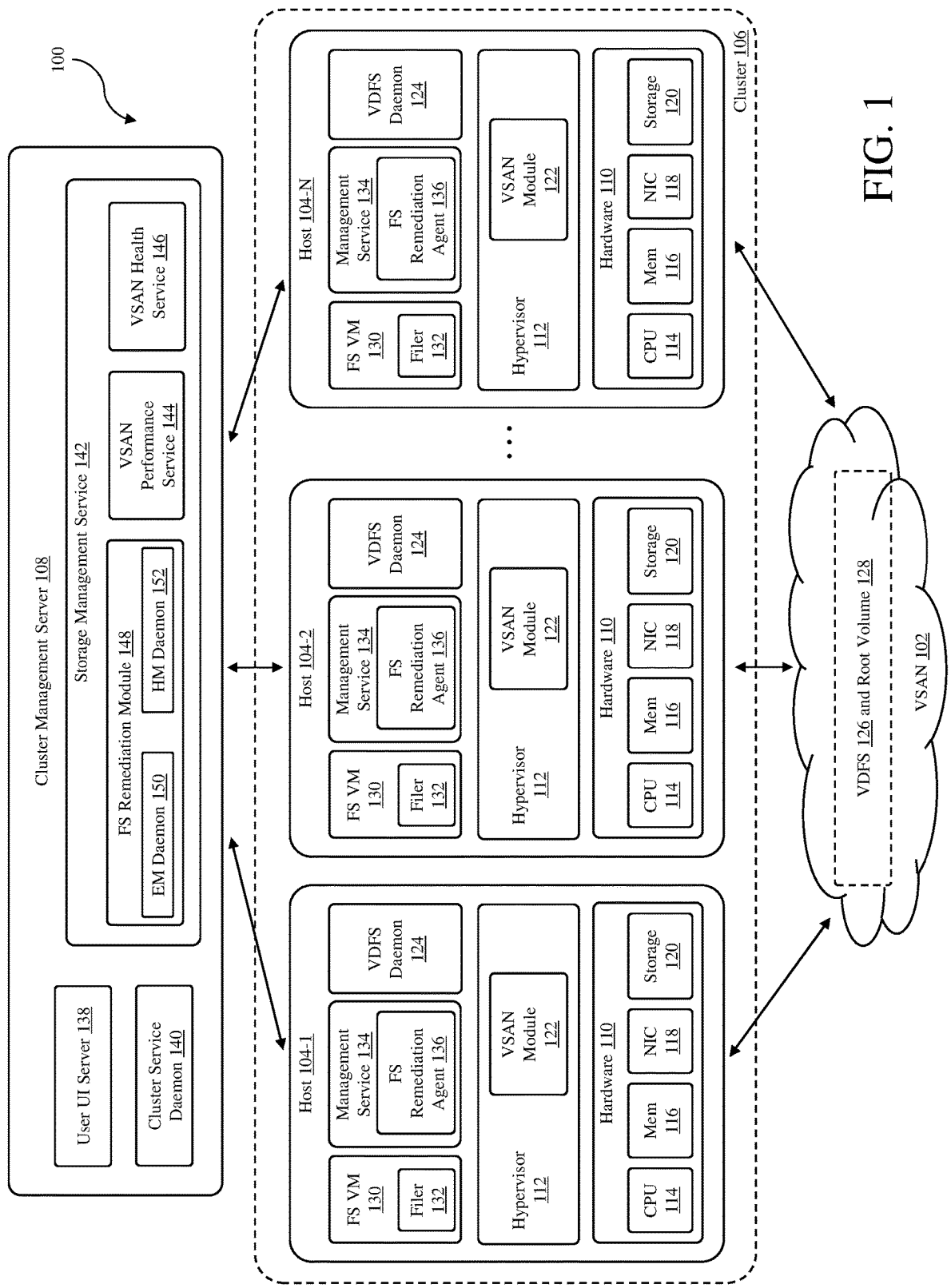
FIG. 1 is a block diagram of a distributed storage system in accordance with an embodiment of the invention.

FIG. 1 illustrates a distributed storage system 100 in accordance with an embodiment of the invention. As shown in FIG. 1, the distributed storage system 100 provides a software-based "virtual storage area network" (VSAN) 102 that leverages local storage resources of host computers 104-1, 104-2 . . . 104-N (where N is a positive integer), which are part of a logically defined cluster 106 of host computers that is managed by a cluster management server 108. The VSAN 102 allows local storage resources of the host computers 104 to be aggregated to form a shared pool of storage resources, which allows the host computers 104, including any software entities running on the host computers, such as virtual computing instances (VCIs), to use the shared storage resources. As used herein, a VCI can be any isolated software entity that can run on a computer system, such as a software application, a software process, a virtual machine (VM), e.g., a VMware VM, or a virtual container, e.g., a Docker container. In some embodiments, the distributed storage system 100 may be a hyperconverged infrastructure (HCI).

As illustrated in FIG. 1, each host computer 104 in the cluster 106 includes hardware 110 and a hypervisor 112. The hardware 110 of each host computer includes hardware components commonly found in a physical computer system, such as one or more processors 114, one or more system memories 116, one or more network interfaces 118 and one or more local storage devices 120 (collectively referred to herein as "local storage"). Each processor 114 can be any type of a processor, such as a central processing unit (CPU) commonly found in a server. In some embodiments, each processor may be a multi-core processor, and thus, includes multiple independent processing units or cores. Each system memory 116, which may be random access memory (RAM), is the volatile memory of the host computer 104. The network interface 118 is an interface that allows the host computer to communicate with a network, such as the Internet. As an example, the network interface may be a network adapter. Each local storage device 120 is a non-volatile storage, which may be, for example, a solid-state drive (SSD) or a magnetic disk.

The hypervisor 112 of each host computer 104, which is a software interface layer that, using virtualization technology, enables sharing of the hardware resources of the host computer by VCIs, such as VMs, running on the host computer. With the support of the hypervisor, the VCIs provide isolated execution spaces for guest software.

In the illustrated embodiment, each hypervisor 112 includes a VSAN module 122. The VSAN module 122 in each host computer 104 provides access to the local storage resources of that host computer (e.g., handles storage input/output (I/O) operations to data objects stored in the local storage resources as part of the VSAN 102) by other host computers 104 in the cluster 106 or any software entities, such as VMs, running on the host computers in the cluster 106. As an example, the VSAN module of each host computer allows any VM running on any of the host computers in the cluster to access data stored in the local storage resources of that host computer, which may include virtual disks (or portions thereof) of VMs running on any of the host computers and other related files of those VMs. In addition to these VM I/Os, the VSAN module may handle other types of storage I/Os. The VSAN modules of the host computers in the cluster cooperatively work together to support the VSAN 102.

Each host computer 104 in the cluster 106 includes a virtual distributed file system (VDFS) daemon 124. The VDFS daemon 124 in each host computer 104 operates to support a VDFS 126 for data stored in the VSAN 102, which includes a root volume 128 that persists all the file service configurations. The VDFS daemons of the host computers 104 in the cluster 106 operate together to provide the VDFS that can be accessed by each host computer 104 in the cluster 106. Thus, the root volume, which is sometimes referred to herein as the root file system, can also be accessed from all the host computers in the cluster. In particular, the management of hierarchical namespace metadata of the VDFS is performed by the various VDFS daemons 124. In an embodiment, all metadata operations (e.g., file/directory creation) for a single volume in the VSAN 102 is handled by a single VDFS daemon running on one host computer. In a particular implementation, the VDFS 126 supported by the VDFS daemons 124 is a distributed Portable Operating System Interface for Computer Environments (POSIX) compatible file system. Although the distributed storage system 100 is described herein as including a VDFS, in some embodiments, the system may include any distributed file system.

Each host computer 104 in the cluster 106 further includes a file service (FS) VCI 130 with one or more filers 132. The FS VCI provides protocol service to end user that is consuming the file service. In an embodiment, the FS VCI provides the operating environment for the filer to function. The filer provides network file service, such as Network File System (NFS) or Server Message Block (SMB), to clients, which can be any software running on any of the host computers in the cluster or software running in any computer system external to the cluster, such as software running in the cluster management server 108. As illustrated in FIG. 1, in an embodiment, the FS VCI in each host computer is a VM running in that host computer, which is hosted or managed by the hypervisor of that host computer. In addition, each filer in the FS VM is a container running in that VM, which can be moved or migrated among the FS VMs in the cluster to provide rebalance and failover ability.

In order to manage such software stack, there is a management service 134 running on each host computer 104 in the cluster 106. The management services running on the different host computers in the cluster coordinate with each other, which requires exchange of configuration data between the management services. The configuration data includes which host computer needs to manage which filer and shares, which are access points for clients. When there is creation or removal of shares, creation or removal of filers, or filer failover activity, the configuration data will be changed accordingly. The configuration data may be stored anywhere that may be accessible by all the management services, such as in a datastore in the VSAN 102. In an embodiment, the management service 134 in each host computer 104 runs in the hypervisor 112 of that host computer.

As illustrated in FIG. 1, the management service 134 in each host computer 104 includes a FS remediation agent 136 that can monitor various components of that host computer and initiate automatic file service (FS) remediation operations. In particular, the FS remediation agent monitors the health of the VDFS daemon 124 and the FS VM 130, including any filer 132 running on the FS VM. The FS remediation agent also monitors accessibility of the VDFS 126 by the software entities running in the host computer. In addition, the FS remediation agent can initiate various host-level remediation actions to ensure the file system is running properly. As used herein, a host-level remediation action includes one or more operations that can be performed by one or more host computers in the cluster 106 without involving the cluster management server 108. That is, a host-level remediation action is executed only by one or more host computers in the cluster. For example, the FS remediation agent in a host computer can initiate a recovery operation of the VDFS daemon in that host computer, which may involve restarting the VDFS daemon. As another example, the FS remediation agent in a host computer can initiate a failover of any filer 132 running on the FS VM 130, which may involve cooperation with the FS remediation agents in the other host computers. Thus, the FS remediation agents are programmed to understand the repair logic for local components, such as recover steps to reload VDFS volumes to a host computer after restarting the VDSF daemon in that host computer. In order to ensure that the resource for the FS remediation agents are controllable, dedicate thread pool for these agent operations is created.

In an embodiment, one of the FS remediation agents 136 is designated as an arbitrator for the cluster 106 to make sure some host level failover operations are orchestrated properly. As example, the arbitrator may make decisions on which host computers to fail over filers 132 from a failed host computer. The designation of an FS remediation agent as the arbitrator for the cluster may involve the use of any known distributed consensus technique, such as Zookeeper. In a VMware vSAN™ cluster, the FS remediation agent that is designated as the arbitrator is the FS remediation agent in the host computer that is the current distributed object manager (DOM) owner of the root volume 128.

In an embodiment, the FS remediation agents 136 may be programmed to periodically send heartbeat messages to peers (e.g., every 5 seconds) to let the other FS remediation agents know whether their host computers are good failover candidates. In an embodiment, each heartbeat message from an FS remediation agent of a particular host computer 104 in the cluster 106 notifies the "arbitrator" FS remediation agent that the particular host computer is alive. In addition, the heartbeat message contains the health state of the host computer and whether there is any failure of filers 132 running on that host computer. If the arbitrator FS remediation agent receives a heartbeat message or notification from a host computer that one or more filers running on that host computer has failed, the arbitrator FS remediation agent initiates a failover operation for the failed filers. If the arbitrator FS remediation agent does not receive a heartbeat message or notification from a host computer for certain period (e.g., 10 seconds), the arbitrator FS remediation agent performs a failover operation for all the filers running on that host computer. If the host computer with the arbitrator FS remediation agent fails, then a new arbitrator FS remediation agent is assigned. In the implementation where the arbitrator FS remediation agent is designated based on the DOM owner of the root volume 128, the new arbitrator FS remediation agent is determined when the root volume ownership has been taken over by another host computer, i.e., the FS remediation agent of that host computer having the root volume ownership is designated as the new arbitrator FS remediation agent.

The failover process involves the arbitrator FS mediation agent loading existing configuration about how the filers 132 are currently distributed in the cluster 106 of host computers. This configuration may persist as a configuration file stored in the VSAN 102. For those filers that need to be failed over, the arbitrator FS mediation agent selects a healthy host computer 104 in the cluster (excluding the current host computer on which each of the filers are running) to reassign each of these filers. In this context, a healthy host computer means that the arbitrator FS remediation agent has received that host computer' heartbeat message, and the information contained therein indicates that the host computer is in a healthy state.

There are different methods that can be used to select healthy host computers 104 for filer failovers. In some embodiments, a healthy host computer for filer failover may be selected by counting the file shares counts provided by all the filers 132 running on each of the healthy host computers and then selecting a healthy host computer with the fewest number of file shares. In some of these embodiments, other factors may also be considered, such as the performance data of the filers on each of the healthy host computers.

Once the reassignments for all the failed over filers 132 are determined, new configuration can be written, e.g., in the configuration file. In addition, the host computers 104 that are impacted by this configuration change is notified using any known mechanism. In a VMware vSAN™ cluster, this notification can be done through a cluster monitoring, membership and directory service (CMMDS). However, in other embodiments, this notification can be achieved using any generic remote call/notification mechanism. Each of the notified host computers can then perform one or more appropriate actions in response to the configuration change. For the host computers that have failed filers removed, these host computers can destroy and cleanup the failed filers. For the host computers that have new filers assigned, these host computers can create the new filers accordingly.

The cluster management server 108 operates to manage and monitor the cluster 106 of host computers 104. The cluster management server may be configured to allow an administrator to create the cluster 106, add host computers to the cluster and delete host computers from the cluster. The cluster management server may also be configured to allow an administrator to change settings or parameters of the host computers in the cluster regarding the VSAN 102, which is formed using the local storage resources of the host computers in the cluster. The cluster management server may further be configured to monitor the current configurations of the host computers and any VCIs running on the host computers. The monitored configurations may include hardware configuration of each of the host computers and software configurations of each of the host computers. The monitored configurations may also include VCI hosting information, i.e., which VCIs (e.g., VMs) are hosted or running on which host computers. The monitored configurations may also include information regarding the VCIs running on the different host computers in the cluster.

The cluster management server 108 may also perform operations to manage the VCIs and the host computers 104 in the cluster 106. As an example, the cluster management server may be configured to perform various resource management operations for the cluster, including VCI placement operations for either initial placement of VCIs and/or load balancing. The process for initial placement of VCIs, such as VMs, may involve selecting suitable host computers for placement of the VCIs based on, for example, memory and CPU requirements of the VCIs, the current memory and CPU load on all the host computers in the cluster and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more VCIs, which may be hosted on any host computers. In an implementation, the cluster management server is a VMware vCenter™ server with at least some of the features available for such a server.

As illustrated in FIG. 1, the cluster management server 108 includes a user interface (UI) server instance 138, a cluster service daemon 140 and a management service 142. The UI server instance operates to provide UI to users of the cluster management server. The UI provided by the UI server instance may display various information regarding the cluster management server 108 and the cluster 106 of host computers, which may include settings, performance metrics and other parameters, as well as events and alerts. In particular, the UI provided by the UI server instance displays remediation information.

The cluster service daemon 140 operates to manage the host computers 104 of the cluster 106 using an agent that is installed in each of the host computers. In an embodiment, the cluster service daemon provides information from the cluster management server and transmits the information to the agents that pass the information to their respective hypervisors. Thus, the cluster service daemon allows the cluster management server 108 to communicate with the host computers of the cluster.

The storage management service 142 operates to manage the VSAN 102 that is supported by the local storages of the host computers 104 in the cluster 106. The storage management service communicates with the management services 134 running in the host computers 104 to monitor various aspects of the VSAN, including performance and health. Thus, as shown in FIG. 1, the storage management service includes a VSAN performance service 144 and a VSAN health service 146. The VSAN performance service operates to monitor the performance of the VSAN by collecting VSAN performance and other metrics, e.g., input/output operations per second (IOPS), throughput and latency, periodically from the cluster. The VSAN health service operates to check the health of the VSAN by performing various checks. These health checks may involve hardware compatibility, network configuration and operation, advanced VSAN configuration options, storage device health and VCI objects.

The storage management service 142 further includes a FS remediation module 148 that performs monitoring and auto-remediation actions at the cluster level to ensure the file system is running properly. As used herein, a cluster-level remediation action includes one or more operations that can be performed by the cluster management server 108. The FS remediation module cooperates with the FS remediation agents 136 running on the different host computers 104 in the cluster 106, each of which performs monitoring and auto-remediation operations at the host level. In particular, the FS remediation module and the FS remediation agents monitor for file system service (FSS)-impacting events in the cluster of host computers. As used herein, an FSS-impacting event in a cluster of host computers is any event that impacts or affects the distributed file system service for the cluster. Thus, these FSS-impacting events may include, but not limited to, host computer membership changes in the cluster, failure of one or more file service components in the cluster that provide the distributed file system service, such as VDFS daemons 124, FS VMs 130 and filers 132, failure of underlying hardware for these components, and failure of one or more networks for the cluster. These FSS-impacting events require one or more remediation operations or steps to ensure that the distributed file system service is being properly provided to all the host computers in the cluster. For some FSS-impacting events in the distributed storage system 100, a combination of cluster-level remediation action and host-level remediation action may be executed. For other FSS-impacting events in the distributed storage system 100, only a cluster-level remediation action or a host-level remediation action may be executed.

In an embodiment, the FS remediation module 148 includes an event monitor (EM) daemon 150 and a health monitor (HM) daemon 152. The event monitor daemon monitors cluster-related events detected by the cluster service daemon 140, such as when a host computer is added to the cluster 106, when a host computer is removed from the cluster and when a host health check has been performed. In an embodiment, the event monitor daemon listens for event messages generated by the cluster service daemon to monitor relevant events that are occurring with respect to the cluster. The health monitor daemon monitors performance data gathered by the VSAN performance service 144 and the health data gathered by the VSAN health service 146. In an embodiment, the health monitor daemon fetches performance and health data from the VSAN performance service and the VSAN health service.

The FS remediation module 148 also monitors the health data of each host computer 104 in the cluster 106 from the FS remediation agent 136 of that host computer. The health data of each host computer may include the health of the VDFS daemon 124, the FS VM 130 and the filers 132 in that host computer, as well as the VDFS accessibility for the host computer. In an embodiment, the FS remediation module may periodically query each of the FS remediation agents to retrieve the health data collected by the FS remediation agents.

As such, the FS remediation module 148 monitors FSS-impacting data available at the cluster management server 108 and FSS-impacting data available at each of the host computers 104 in the cluster 106. Consequently, the FS remediation module is able to detect events and situations in the cluster that can affect the VDFS 126 in order to automatically take appropriate remediation actions.

The FS remediation module 148 also controls the lifecycle of the FS remediation agents 136 running on the host computers 104 in the cluster 106. As an example, when a new host computer is added to the cluster, the FS remediation module may control the deployment of a FS remediation agent in the new host computer, which may involve transmitting the necessary software to the new host computer to instantiate the FS remediation agent in the host computer, starting the FS remediation agent and registering the FS remediation agent for the cluster, e.g., in a list or database. As another example, when an existing host computer is deleted from the cluster, the FS remediation agent may ensure that the FS remediation agent of that host computer is deregistered for the cluster, e.g., from a list or database.

The FS remediation module 148 in the cluster management server 108 and the FS remediation agents 136 in the host computers 104 of the cluster 106 operate to detect FSS-impacting events in the cluster and automatically take remediation steps to ensure the VDFS 126 is functioning properly for all the host computers in the cluster. The automatic remediation steps taken by the FS remediation module and agents will depend the FSS-impacting events detected. Below are examples of automatic remediation steps for different FSS-impacting events.

Figure 2A:
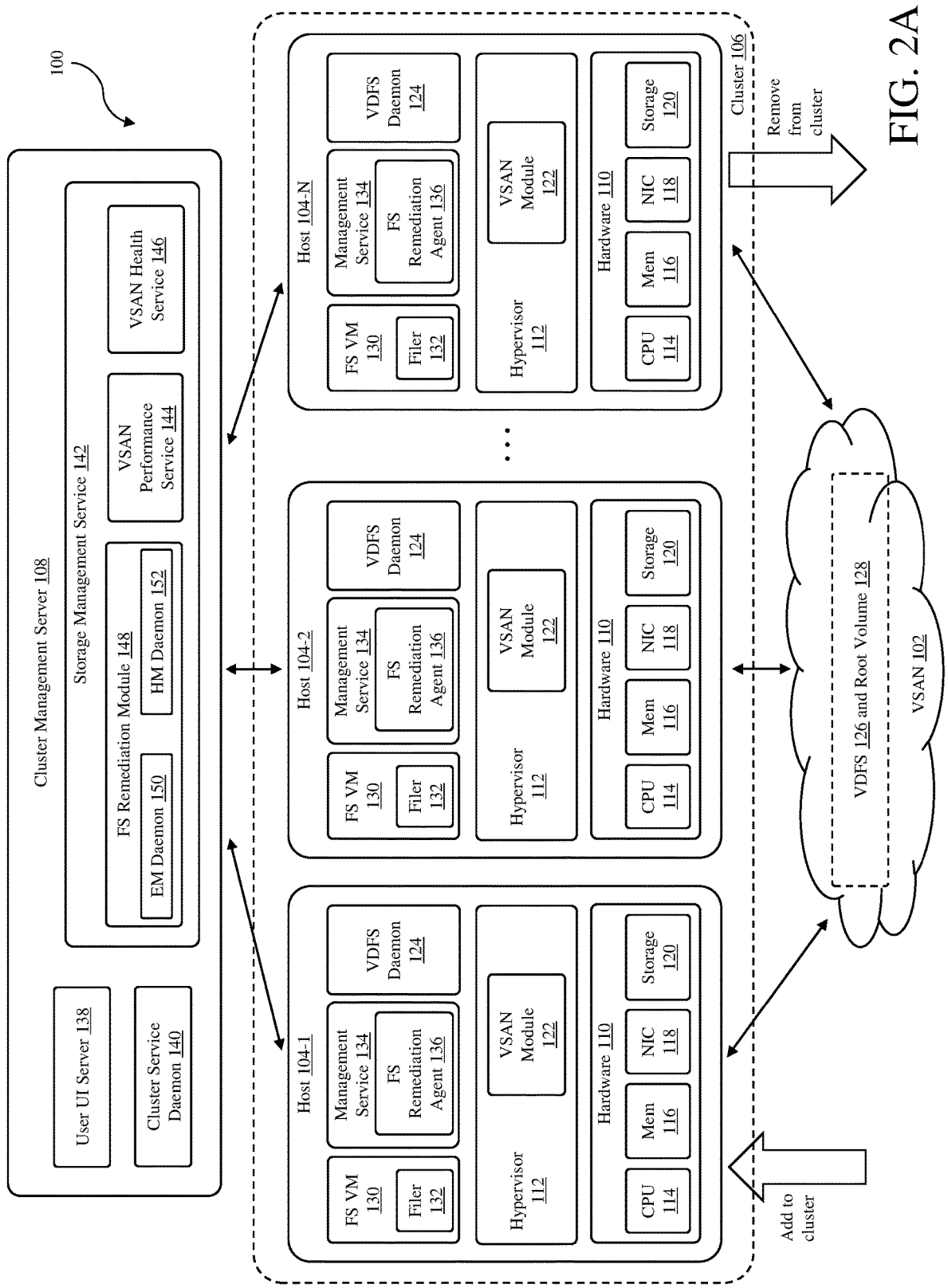
FIG. 2A illustrates automatic remediation when a host computer is added to or removed from a cluster of host computers in the distributed storage system of FIG. 1 in accordance with an embodiment of the invention.

In the first example, as illustrated in FIG. 2A, a host computer 104-0 is moved into the cluster 106, i.e., added to the cluster. When such event occurs, the event monitor daemon 150 of the FS remediation module 148 in the cluster management server 108 that monitors the cluster service daemon 140 will notice this event, which is an FSS-impacting event. In response, the FS remediation module will start the appropriate remediation steps for the newly added host computer. For this FSS-impacting event, the appropriate remediation steps involve operations to ensure that the newly added host computer 104-0 has the capability to provide file service, i.e., access and use the VDFS 126 in the VSAN 102. These remediation steps may include deploying an FS VM 130 in the newly added host computer, starting a VDFS daemon 124 in the newly added host computer, and mounting the root FS to the newly added host computer. Thus, file service requirements for scaling out the cluster with additional host computers are automatically fulfilled using the FS remediation module and agents.

Also illustrated in FIG. 2A, the host computer 104-N is moved out of the cluster 106, i.e., removed from the cluster. Similar to the event when a host computer is added to the cluster, the event monitor daemon 150 of the FS remediation module 148 will notice this host removed event, which is an FSS-impacting event. In response, the FS remediation module will start the appropriate remediation steps for the removed host computer. For this FSS-impacting event, the appropriate remediation steps involve operations to disable the file service on the removed host computer 104-N, such as stopping the VDFS daemon 124 on the removed host computer and other file service related components in the removed host computer, which may involve the FS remediation agent 136 in the removed host computer.

Figure 2B:
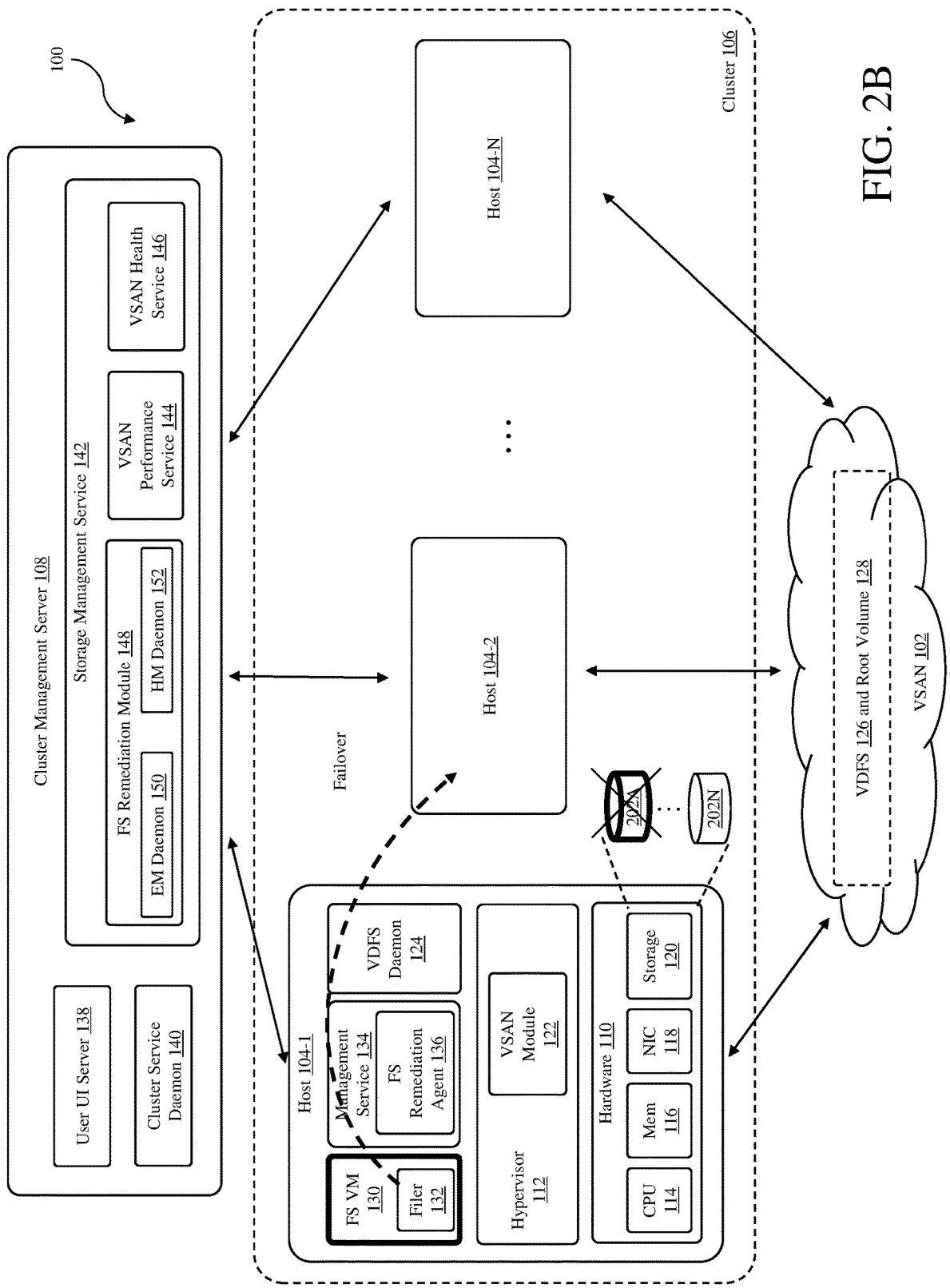
FIG. 2B illustrates automatic remediation when a storage disk for a file system (FS) virtual machine (VM) fails in the distributed storage system of FIG. 1 in accordance with an embodiment of the invention.

In the second example, as illustrated in FIG. 2B, there is hardware failure on a certain host computer in the cluster 106, i.e., the host computer 104-1, which has multiple storage disks 202A . . . 202N. In this example, the storage disk 202A for the FS VM 130 in the host computer 104-1 is having issues and any filers 132 running on the FS VM are inaccessible. For this FSS-impacting event, the FS remediation agent 136 in the host computer 104-1 will detect that these filers 132 are inaccessible. In response, the FS remediation agents 136 in the cluster 106 will coordinate with the designated arbitrator among the FS remediation agents to fail over these filers 132 to one or more of FS VMs of other host computers in the cluster, such as the host computer 104-2 as indicated in FIG. 2B. On the cluster management server 108, the FS remediation module 148 is notified of the storage disk issue in the host computer 104-1 by the FS remediation agent 136 in that host computer. In response, the FS remediation module 148 will try to re-deploy the FS VM 130 for the host computer 104-1 on one or more healthy disks of the host computers in the cluster 106.

Figure 2C:
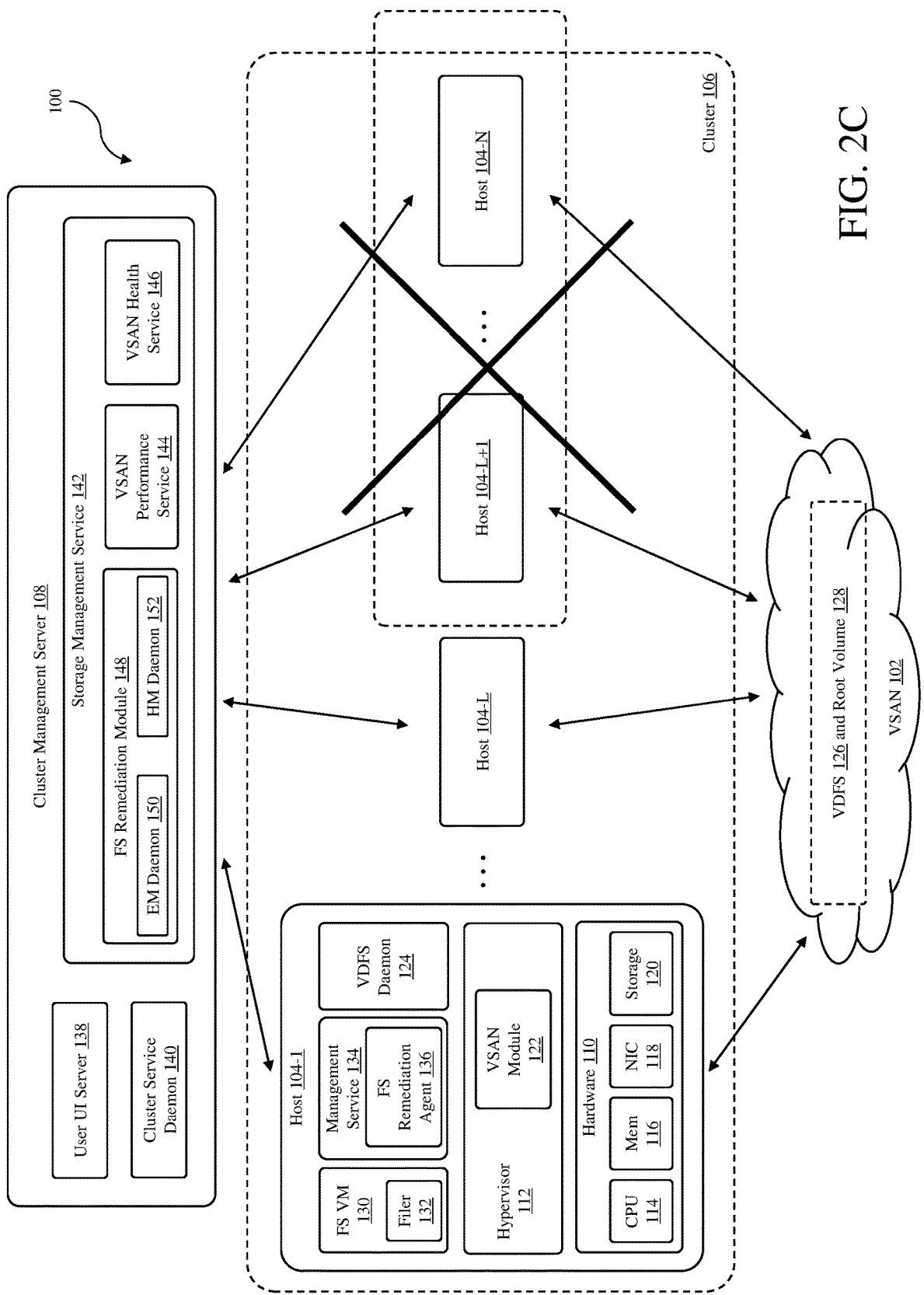
FIG. 2C illustrates automatic remediation when there is a network partition within a cluster of host computers in the distributed storage of FIG. 1 in accordance with an embodiment of the invention.

In the third example, as illustrated in FIG. 2C, there is a network partition at the host side, which causes the host computers 104L+1 to 104N to loss data access, i.e., no access to the VSAN 102. When such event occurs, the FS remediation module 148 in the cluster management server 108 that monitors the VSAN performance service 144 and the VSAN health service 146 will notice this event, which is an FSS-impacting event. In response, the FS remediation module 148 will notify the FS remediation agents 136 in the host computers 104-1 . . . 104-L of the FSS-impacting event. After the notification, the FS remediation agents that have data access will form a file service cluster by failing over all the filers 132 to this file service cluster. In addition, the FS remediation agents in the new file service cluster may reselect an arbitrator, if needed. In a particular implementation, the FS remediation agent that is designated as the arbitrator is the current distributed object manager (DOM) owner of the root volume 128, and thus, in this implementation, the arbitrator will be the current DOM owner of the root volume. The FS remediation module will also issue an alert via the user UI server 138 to inform the administrator that the host computers 104-L+1 . . . 104N do not have data access. In an alternative embodiment, in addition to sending out the notification, the FS remediation module 148 may also instruct the FS remediation agents 136 in the host computers that have data access to form a file service cluster by failing over all the filers 132 to the new file service cluster. In addition, the FS remediation module may also instruct these FS remediation agents to reselect an arbitrator among the FS remediation agents in the new file service cluster, if necessary.

Figure 3:
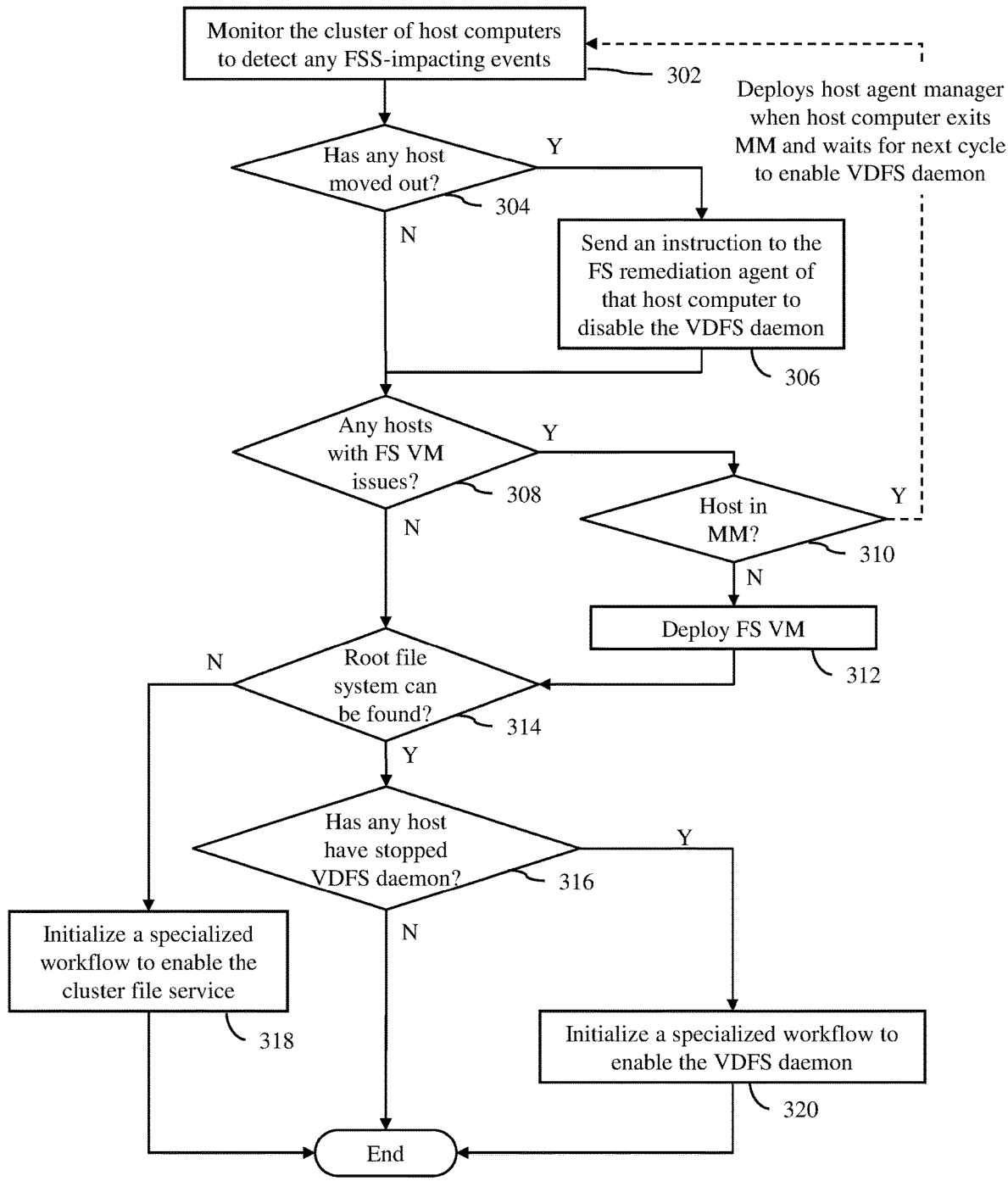
FIG. 3 is a flow diagram of a cluster remediation process executed in the distributed storage system of FIG. 1 in accordance with an embodiment of the invention.

FIG. 3 is a flow diagram of a cluster remediation process in the distributed storage system 100 in accordance with an embodiment of the invention. At block 302, the cluster 106 of host computers 104 is monitored by the FS remediation module 148 in the cluster management server 108 to detect any FSS-impacting events. The monitoring of the cluster of host computers may include events detected by the cluster service daemon 140, performance data gathered by the VSAN performance service 144 and health data gathered by the VSAN health service 146. In an embodiment, the following steps may be initiated periodically by the FS remediation module in the cluster management server. In other embodiments, the following steps may be initiated when one or more FSS-impacting events are detected for the cluster of host computers by the FS remediation module.

At block 304, a determination is made by the FS remediation module 148 whether any host computer 104 has moved out of the cluster 106 of host computers. If no, the process proceeds to block 308. However, if a host computer has moved out of the cluster of host computers, an instruction is sent to the FS remediation agent 136 of that host computer to disable the VDFS daemon 124 running on that host computer, at block 306. The process then proceeds to block 308.

Next, at block 308, a determination is made by the FS remediation module 148 whether any host computer has FS VM issues, e.g., the FS VM is down due to storage disk failure or a new host computer has joined the cluster 106. If no, the process proceeds to block 314. However, if a host computer has FS VM issues, a determination is made whether the host computer is in maintenance mode, at block 310. If the host computer is in maintenance mode, the process proceeds back to block 302. In a particular implementation, the FS VM of a host computer is powered off directly by a host enter maintenance mode (EMM) operation, and failover of filers in that host computer is then triggered automatically. In addition, the VDFS daemon of the host computer is disabled. When the host computer exits the maintenance mode, a host agent manager, such as vSphere ESX agent manager, is automatically deployed. The VDFS daemon of the host computer is enabled at the next cluster remediation cycle. However, if the host computer is not in maintenance mode, the FS VM is deployed or redeployed in the host computer by the FS remediation module, at block 312.

Next, at block 314, a determination is made by the FS remediation module 148 whether the root FS can be found. If yes, the process proceeds to block 316. However, if the root FS cannot be found, a specialized workflow of the cluster management server 108 is initiated by the FS remediation module to enable the cluster file service, at block 318. The process then comes to an end.

At block 316, a determination is made by the FS remediation module 148 whether there are any host computers with a VDFS daemon 124 that has stopped. If no, the process comes to an end. However, if there is a host computer with a stopped VDFS daemon, a specialized workflow of the cluster management server 108 is initiated by the FS remediation module 148 to enable the VDFS daemon, which may involve restarting the VDFS daemon for the host computer, at block 320. The process then comes to an end.

Figure 4:
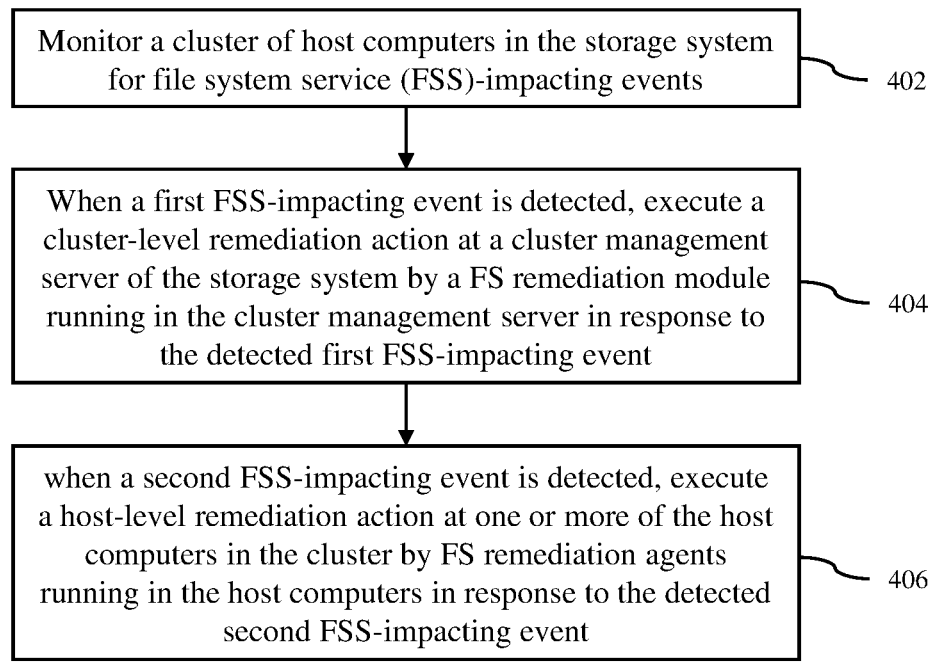
FIG. 4 is a flow diagram of a computer-implemented method for automatic remediation for a distributed file system in a storage system in accordance with an embodiment of the invention.

A computer-implemented method for automatic remediation for a distributed file system in a storage system, such as the distributed storage system 100, in accordance with an embodiment of the invention is described with reference to a flow diagram of FIG. 4. At block 402, a cluster of host computers in the storage system is monitored for file system service (FSS)-impacting events. At block 404, when a first FSS-impacting event is detected, a cluster-level remediation action is executed at a cluster management server of the storage system by a FS remediation module running in the cluster management server in response to the detected first FSS-impacting event. At block 406, when a second FSS-impacting event is detected, a host-level remediation action is executed at one or more of the host computers in the cluster by FS remediation agents running in the host computers in response to the detected second FSS-impacting event.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for automatic remediation for a distributed file system in a storage system, the method comprising:
   monitoring a cluster of host computers in the storage system for file system service (FSS)-impacting events;
   when a first FSS-impacting event is detected, executing only a cluster-level remediation action at a cluster management server of the storage system by a file system (FS) remediation module running in the cluster management server in response to the detected first FSS-impacting event;
   when a second FSS-impacting event is detected, executing only a host-level remediation action at one or more of the host computers in the cluster by FS remediation agents running in the host computers in response to the detected second FSS-impacting event; and
   when a third FSS-impacting event is detected, executing a combination of cluster-level and host-level remediation actions by the FS remediation module running in the cluster management server and by the FS remediation agents running in the host computers in response to the detected third FSS-impacting event.

2. The method of claim 1, wherein monitoring the cluster of host computers includes monitoring performance and health data of the storage system at the cluster management cluster and receiving health data of the host computers from the FS remediation agents running in the host computers.

3. The method of claim 1, further comprising designating one of the FS remediation agents running in the host computers as an arbitrator to orchestrate failover activities among the host computers.

4. The method of claim 3, further comprising sending heartbeat messages between the FS remediation agents running in the host computers to publish the host computers that are good failover candidates.

5. The method of claim 1, wherein each host computer includes a single file system virtual computing instance in which one or more filers are running and a hypervisor in which the FS remediation agent of that host computer is running.

6. The method of claim 1, wherein the first FSS-impacting event is a new host computer being added to the cluster and wherein the cluster-level remediation action includes deploying a file system virtual computing instance in the new host computer, starting a virtual distributed file system daemon in the new host computer and mounting a root volume to the new host computer.

7. The method of claim 1, wherein the third FSS-impacting event is a failure of a storage disk for a file service virtual computing instance in one of the host computers in the cluster and wherein the combination of cluster-level and host-level remediation actions includes re-deploying the file system virtual computing instance on one or more healthy storage disks of the host computers in the cluster.

8. The method of claim 1, wherein the third FSS-impacting event is a network partition and wherein the combination of cluster-level and host-level remediation actions includes notifying the FS remediation agents in the host computers that have data access to form a file service cluster by failing over all filers in the cluster to the file service cluster.

9. A non-transitory computer-readable storage medium containing program instructions for automatic remediation for a distributed file system in a storage system, wherein execution of the program instructions by one or more processors of a computer system causes the one or more processors to perform steps comprising:
   monitoring a cluster of host computers in the storage system for file system service (FSS)-impacting events;
   when a first FSS-impacting event is detected, executing only a cluster-level remediation action at a cluster management server of the storage system by a file system (FS) remediation module running in the cluster management server in response to the detected first FSS-impacting event;
   when a second FSS-impacting event is detected, executing only a host-level remediation action at one or more of the host computers in the cluster by FS remediation agents running in the host computers in response to the detected second FSS-impacting event; and
   when a third FSS-impacting event is detected, executing a combination of cluster-level and host-level remediation actions by the FS remediation module running in the cluster management server and by the FS remediation agents running in the host computers in response to the detected third FSS-impacting event.

10. The computer-readable storage medium of claim 9, wherein monitoring the cluster of host computers includes monitoring performance and health data of the storage system at the cluster management cluster and receiving health data of the host computers from the FS remediation agents running in the host computers.

11. The computer-readable storage medium of claim 9, further comprising designating one of the FS remediation agents running in the host computers as an arbitrator to orchestrate failover activities among the host computers.

12. The computer-readable storage medium of claim 11, further comprising sending heartbeat messages between the FS remediation agents running in the host computers to publish the host computers that are good failover candidates.

13. The computer-readable storage medium of claim 9, wherein each host computer includes a single file system virtual computing instance in which one or more filers are running and a hypervisor in which the FS remediation agent of that host computer is running.

14. The computer-readable storage medium of claim 9, wherein the first FSS-impacting event is a new host computer being added to the cluster and wherein the cluster-level remediation action includes deploying a file system virtual computing instance in the new host computer, starting a virtual distributed file system daemon in the new host computer and mounting a root volume to the new host computer.

15. The computer-readable storage medium of claim 9, wherein the third FSS-impacting event is a failure of a storage disk for a file service virtual computing instance in one of the host computers in the cluster and wherein the combination of cluster-level and host-level remediation actions includes re-deploying the file system virtual computing instance on one or more healthy storage disks of the host computers in the cluster.

16. The computer-readable storage medium of claim 9, wherein the third FSS-impacting event is a network partition and wherein the combination of cluster-level and host-level remediation actions includes notifying the FS remediation agents in the host computers that have data access to form a file service cluster by failing over all filers in the cluster to the file service cluster.

17. A system comprising:
a cluster management server with a file system (FS) remediation module; and
a cluster of host computers with FS remediation agents, each host computer including memory and at least one processor,
wherein the FS remediation module in the cluster management server is configured to monitor the cluster of host computers for file system service (FSS)-impacting events and when a first FSS-impacting event is detected, execute only a cluster-level remediation action at the cluster management server in response to the detected first FSS-impacting event,
wherein the FS remediation agents in the cluster of host computers are configured to, when a second FSS-impacting event is detected, execute only a host-level remediation action at one or more of the host computers in the cluster in response to the detected second FSS-impacting event, and
wherein the FS remediation module in the cluster management server and the FS remediation agents in the cluster of host computers are further configured to, when a third FSS-impacting event is detected, execute a combination of cluster-level and host-level remediation actions in response to the detected third FSS-impacting event.

18. The system of claim 17, wherein each host computer includes a single file system virtual computing instance in which one or more filers are running and a hypervisor in which the FS remediation agent of that host computer is running.

\* \* \* \* \*